US008119079B2

(12) United States Patent
Cho et al.

(10) Patent No.: US 8,119,079 B2
(45) Date of Patent: Feb. 21, 2012

(54) MICROFLUIDIC APPARATUS HAVING FLUID CONTAINER

(75) Inventors: Yoon-kyoung Cho, Suwon-si (KR); Beom-seok Lee, Hwaseong-si (KR); Jeong-gun Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 510 days.

(21) Appl. No.: 12/053,656

(22) Filed: Mar. 24, 2008

(65) Prior Publication Data

US 2008/0305006 A1 Dec. 11, 2008

(30) Foreign Application Priority Data

Jun. 5, 2007 (KR) ........................ 10-2007-0055247

(51) Int. Cl.
*B01J 19/00* (2006.01)

(52) U.S. Cl. ........ 422/504; 422/502; 422/417; 422/537; 422/72; 422/50; 436/43; 436/174; 436/178; 436/180

(58) Field of Classification Search ................. 422/68.1, 422/99, 100, 72, 58, 502, 417, 537; 436/43, 436/174, 178, 180
See application file for complete search history.

(56) References Cited

U.S. PATENT DOCUMENTS

| | | | | |
|---|---|---|---|---|
| 4,690,801 | A * | 9/1987 | Anderson | 422/100 |
| 4,978,502 | A * | 12/1990 | Dole et al. | 422/102 |
| 7,152,616 | B2 * | 12/2006 | Zucchelli et al. | 422/103 |
| 2002/0106786 | A1 * | 8/2002 | Carvalho et al. | 422/72 |
| 2003/0156991 | A1 * | 8/2003 | Halas et al. | 422/100 |
| 2003/0186456 | A1 | 10/2003 | Stroup | |
| 2004/0121454 | A1 * | 6/2004 | Jury et al. | 435/288.5 |
| 2004/0171170 | A1 | 9/2004 | Sandell | |
| 2006/0183216 | A1 | 8/2006 | Handique et al. | |
| 2006/0245972 | A1 | 11/2006 | Osone et al. | |
| 2007/0009391 | A1 * | 1/2007 | Bedingham et al. | 422/100 |
| 2007/0166200 | A1 * | 7/2007 | Zhou et al. | 422/100 |
| 2008/0042096 | A1 * | 2/2008 | Park et al. | 251/368 |

FOREIGN PATENT DOCUMENTS

| | | | |
|---|---|---|---|
| EP | 1464398 | A2 | 10/2004 |
| WO | 00/79285 | A2 | 12/2000 |
| WO | 2004/050242 | A2 | 6/2004 |

OTHER PUBLICATIONS

European patent office communication mailed Jun. 2, 2010, in a counterpart European Application No. 08154703.6.

* cited by examiner

*Primary Examiner* — In Suk Bullock
*Assistant Examiner* — Sharon Pregler
(74) *Attorney, Agent, or Firm* — Sughrue Mion, PLLC

(57) ABSTRACT

A microfluidic apparatus having a substrate including a channel through which a fluid is conveyed, a fluid container in which at least one kind of fluid is accommodated and which is disposed on the substrate so as to allow the fluid to flow toward the channel, and a fluid flow controller which controls a flow of the fluid toward the channel from the fluid container.

21 Claims, 8 Drawing Sheets

MICROFLUIDIC APPARATUS HAVING FLUID CONTAINER

CROSS-REFERENCE TO RELATED PATENT APPLICATIONS

This application claims priority from Korean Patent Application No. 10-2007-0055247, filed on Jun. 5, 2007, in the Korean Intellectual Property Office, the disclosure of which is incorporated herein in its entirety by reference.

BACKGROUND OF THE INVENTION

1. Field of the Invention

The present invention relates to microfluidics, and more particularly, to a microfluidic apparatus having a fluid container in which a limitation due to the thickness of a substrate is overcome and a large amount of fluid can be accommodated.

2. Description of the Related Art

Generally, in the field of microfluidics, a microfluidic apparatus using a small amount of fluid in the field of microfluidics comprises a chamber in which the small amount of fluid is accommodated, a channel through which the fluid flows, and a valve which controls the flow of the fluid. An apparatus manufactured to perform a test, including a biochemical reaction on a small-sized chip, is referred to as a bio-chip. In particular, an apparatus manufactured to perform fluid processing and manipulation in several steps is referred to as a lab-on-a-chip.

A driving pressure is needed to convey a fluid in a microfluidic apparatus. A capillary pressure or a pressure caused by a separate pump is used as the driving pressure. Recently, centrifugal force-based microfluidic apparatuses, which drive a fluid by using centrifugal force generated by rotating a disc-shaped microfluidic apparatus having a chamber and a channel, have been suggested. This kind of apparatus is referred to as a Lab CD or a Lab-on-a-CD.

When a biochemical test is performed using the microfluidic apparatus, a large amount of a fluid is needed. For example, when a liver function test is performed, a large amount of a buffer solution corresponding to several hundreds or thousands times of a required amount of a whole blood (WB) sample, is needed. However, since generally the chamber and channel of the microfluidic apparatus are formed inside a flat substrate, the size of the substrate must be increased so as to increase the capacity of the chamber to accommodate the buffer. In addition, the arrangement of the chamber and the channel in the substrate cannot be easily performed. As a result, costs for manufacturing a microfluidic apparatus are increased and it is difficult to implement an integrated micro fluidic apparatus.

SUMMARY OF THE INVENTION

An aspect of the present invention is to provide a microfluidic apparatus having a fluid container in which a limitation due to the thickness of a substrate is overcome and a large amount of fluid can be accommodated.

According to a non-limiting embodiment of the present invention, there is provided a microfluidic apparatus comprising: a substrate including a channel through which a fluid is conveyed; a fluid container in which at least one kind of fluid is accommodated and which is disposed on the substrate so as to allow the fluid to flow toward the channel; and a fluid flow controller which controls a flow of the fluid toward the channel from the fluid container.

The fluid container may be adhered to and fixed on the substrate.

The fluid container may be detachably attached to the substrate.

The microfluidic apparatus may be installed in a motor providing a rotational driving force and may be rotatable.

The fluid container may be disposed closer to a rotation center of the microfluidic apparatus than the channel.

The fluid container may further comprise a pouch in which the fluid is accommodated and which is sealed to be perforated.

The fluid flow controller may prevent arbitrary outflow of the fluid accommodated in the fluid container and comprise a container lid which is perforated or melted by an energy of an electromagnetic wave.

At least a portion of the fluid container may be transparent so that the electromagnetic wave can be incident on the container lid.

The container lid may comprise a thin film on which an electromagnetic wave-absorbing material is coated.

The thin film may be formed of metal.

The fluid container may be attached to the substrate to be rotated or slid on the substrate, and the fluid flow controller may comprise a container lid which prevents arbitrary outflow of the fluid accommodated in the fluid container.

The substrate may comprise an explosion unit which explodes the container lid by contacting the container lid when the fluid container is rotated or slid on the substrate.

The container lid may comprise a thin film, and the explosion unit may comprise a pin which protrudes toward the container lid.

The fluid container may comprise a plurality of fluid accommodation spaces in which at least two kinds of fluid are separated and accommodated, and the plurality of fluid accommodation spaces may be made to be different from one another by having different sizes, different colors or different patterns formed on the outside thereof.

The fluid flow controller may comprise a valve which comprise a phase transition material and is hardened at the channel to close the channel and is melted by an energy of an electromagnetic wave to open the channel.

The phase transition material may be a wax, a gel or a plastic resin.

The valve may comprise a plurality of microheating particles which are dispersed in the phase transition material and absorb an energy of an electromagnetic wave to dissipate heat.

The microheating particles may be micrometal oxides.

The micrometal oxides may be $Al_2O_3$, $TiO_2$, $Ta_2O_3$, $Fe_2O_3$, $Fe_3O_4$ or $HfO_2$.

The microheating particles may be polymer particles, quantum dots or magnetic beads.

BRIEF DESCRIPTION OF THE DRAWINGS

The above and other features and advantages of the present invention will become more apparent by describing in detail exemplary, non-limiting embodiments thereof with reference to the attached drawings in which.

DETAILED DESCRIPTION OF THE INVENTION

The present invention will now be described more fully with reference to the accompanying drawings, in which exemplary, non-limiting embodiments of the invention are shown.

Figure 1:
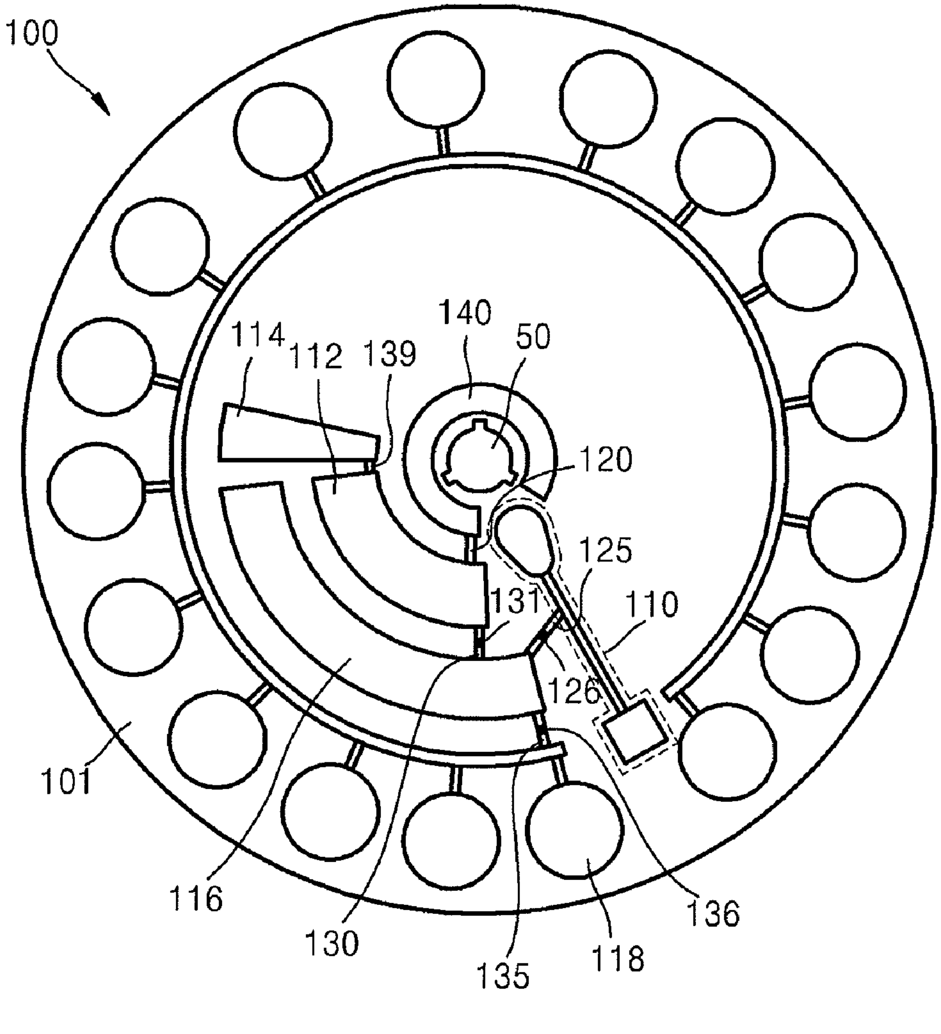
FIG. 1 is a plan view of a microfluidic apparatus according to a non-limiting embodiment of the present invention.
Figure 2A:
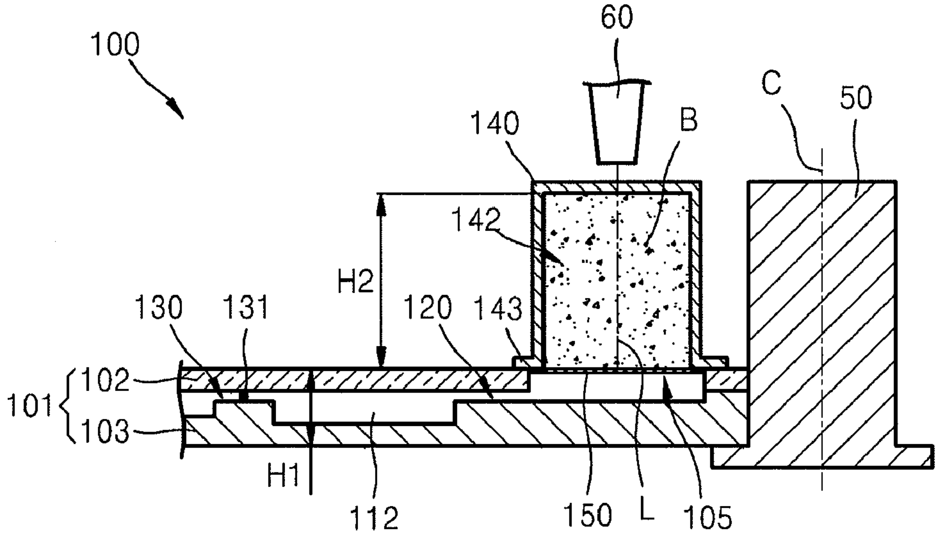
FIGS. 2A and 2B are cross-sectional views sequentially illustrating a fluid-conveying operation in the microfluidic apparatus of FIG. 1.
Figure 2B:
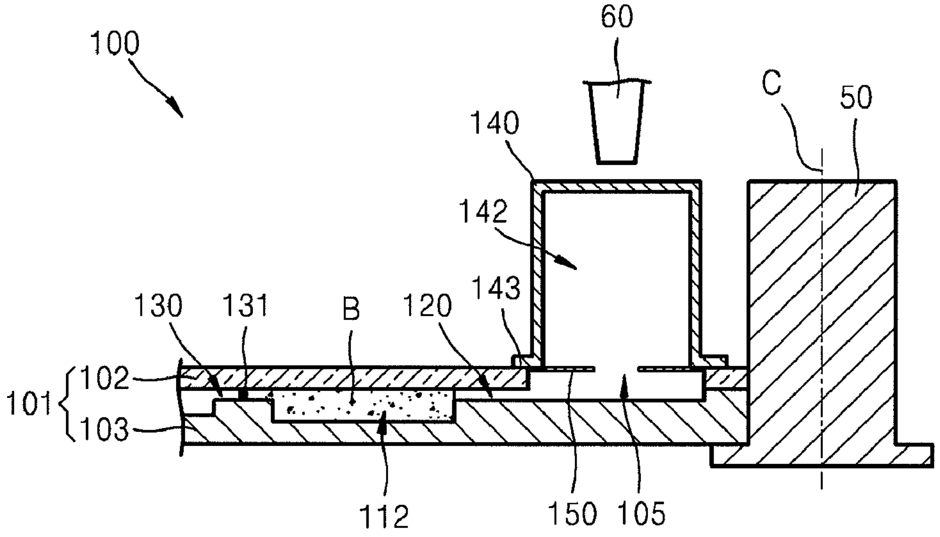
Figure 3:
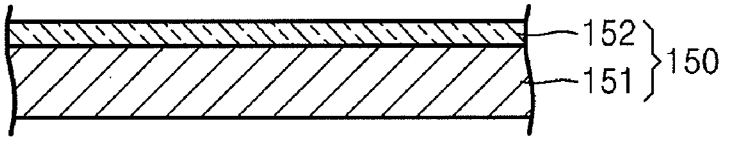
FIG. 3 is an enlarged cross-sectional view of a container lid of FIG. 2A.

FIG. 1 is a plan view of a microfluidic apparatus according to a non-limiting embodiment of the present invention, FIGS. 2A and 2B are cross-sectional views sequentially illustrating a fluid-conveying operation in the microfluidic apparatus of FIG. 1, and FIG. 3 is an enlarged cross-sectional view of a container lid of FIG. 2A.

Referring to FIG. 1, a microfluidic apparatus 100 according to a non-limiting embodiment of the present invention comprises a disc-shaped substrate 101 and a fluid container 140 which is attached to the substrate 101. A chamber in which a fluid is accommodated, a channel through which the fluid is conveyed, and a valve which controls the flow of the fluid flowing along the channel are provided inside the substrate 101 (as described later). Specifically, the microfluidic apparatus 100 of FIG. 1, according to the current non-limiting embodiment, is used for a liver function test. A centrifugal separation unit 110 which centrifugally separates a sample such as whole blood (WB), a mixing chamber 116 in which serum extracted from the centrifugal separation unit 110 and a buffer are mixed, and a reaction chamber 118 in which a reagent reacting a particular material included in serum is accommodated are provided inside the substrate 101. In addition, provided inside the substrate 101 are a metering chamber 112, in which only a fixed amount of a buffer B (see FIG. 2A) flowing in from the fluid container 140 is accommodated so as to quantitatively supply the buffer B to the mixing chamber 116, and a discharge chamber 114 in which a redundancy buffer is accommodated.

The buffer B (see FIG. 2A) is accommodated in the fluid container 140. A first channel 120 in which a fluid is conveyed to the metering chamber 112 from the fluid container 140, a second channel 125 in which the fluid is conveyed to the mixing chamber 116 from the centrifugal separation unit 110, a third channel 130 in which the fluid is conveyed to the mixing chamber 116 from the metering chamber 112, a fourth channel 135 in which the fluid is conveyed to the reaction chamber 118 from the mixing chamber 116, and a fifth channel 139 in which the fluid is conveyed to the discharge chamber 114 from the metering chamber 112, are provided inside the substrate 101. Valves 126, 131, and 136 which control the flow of the fluid are provided in the second through fourth channels 125, 130, and 135. The valves 126, 131, and 136 are so-called ‘normally closed valves’ which normally close the channels 125, 130, and 135 and only open them under predetermined conditions. However, the microfluidic apparatus according to the present invention is not limited to the arrangement shape of the chamber, the channel, and the valve of FIG. 1 and may be designed in various shapes according to particular usages in the field of biochemistry such as immunoassay or gene analysis.

The microfluidic apparatus 100 is installed in a spindle motor 50 which provides a rotation driving force. When the microfluidic apparatus 100 is rotated by the operation of the spindle motor 50, a centrifugal force-based pressure is applied to the fluid inside the substrate 101 and the fluid container 140 so that conveying or mixing of the fluid is promoted.

Referring to FIGS. 2A and 2B, the substrate 101 comprises an upper plate 102 and a lower plate 103 which are adhered to each other. The upper plate 102 and the lower plate 103 may be adhered to each other by ultrasonic wave fusion or by interposing double-sided adhesive tape between the upper and lower plates 102 and 103. The upper plate 102 and the lower plate 103 may be manufactured by injection molding a plastic resin. The fluid container 140 comprises a fluid accommodation space 142 in which a fluid such as a buffer B is accommodated. The fluid container 140 is manufactured by injection molding the plastic resin and is adhered to and fixed in the substrate 101. The fluid container 140 in which the fluid B is accommodated is sealed by a container lid 150. Specifically, the fluid container 140 is turned over, the fluid B is injected into the fluid accommodation space 142, and the container lid 150 is adhered to an aperture circumferential portion 143 of the fluid container 140 so that outflow of the fluid can be prevented. Then, the fluid container 140 is adhered to and fixed in the substrate 101 so that a groove portion 105 formed to be near the spindle motor 50 and the container lid 150 face each other.

The present invention is not limited to the non-limiting embodiment of FIG. 2A, and unlike FIG. 2A, a fluid pouch in which a fluid is accommodated and is initially sealed to be later perforated or melted may be provided inside the fluid container.

The groove portion 105 is connected to the first channel 120, and the groove portion 105 and the fluid container 140 that overlaps with the groove portion 105 are more near a rotation center C than the first channel 120. The fluid container 140 is adhered to the substrate 101 to be protruded toward a higher position than the upper side of the substrate 101, and in order to increase the accommodation amount of the fluid B, a height H2 of the fluid accommodation space 142 is set to be larger than a thickness H1 of the substrate 101.

The container lid 150 constitutes a fluid flow controller which controls the flow of the fluid B directing toward the channel 120 from the fluid container 140. The container lid 150 prevents arbitrary outflow of the fluid B accommodated in the fluid accommodation space 142 and is perforated or melted by an energy of an electromagnetic wave L, such as laser, that is incident from an external energy source 60.

Specifically, referring to FIG. 3, the container lid 150 comprises a metallic thin film 151 and an electromagnetic wave-absorbing layer 152 stacked on the thin film 151. The electromagnetic wave-absorbing layer 152 is formed by coating an electromagnetic wave-absorbing material on the metallic thin film 151. Due to the electromagnetic wave-absorbing layer 152, the container lid 150 absorbs the electromagnetic wave L that is projected from an energy source 60 and is perforated or melted. The thin film 151 may be formed of another material such as polymer as well as metal, that can be perforated or melted by irradiating the electromagnetic wave L.

Referring to FIG. 2A, the energy source 60 may comprises a laser light source which projects a laser, and the laser light source may comprise at least one laser diode (LD). At least a portion of the fluid container 140 is transparent so that the electromagnetic wave L projected from an outside of the fluid container 140 can pass through the fluid container 140 and can be irradiated onto the container lid 150.

When the electromagnetic wave L is irradiated onto the container lid 150 using the energy source 60 for a predetermined time, the container lid 150 is perforated or melted as shown in FIG. 2B. When the microfluidic apparatus 100 in which the container lid 150 is perforated or melted is rotated by the spindle motor 50, the fluid B (see FIG. 2A) accommodated in the fluid accommodation space 142 passes through the groove portion 105 and the first channel 120, moves to the metering chamber 112 and is accommodated in the metering chamber 112 (see FIG. 2B). A redundancy fluid B that is not accommodated in the metering chamber 112 passes through the fifth channel 139 (see FIG. 1) and is accommodated in the discharge chamber 114 (see FIG. 1).

Figure 4A:
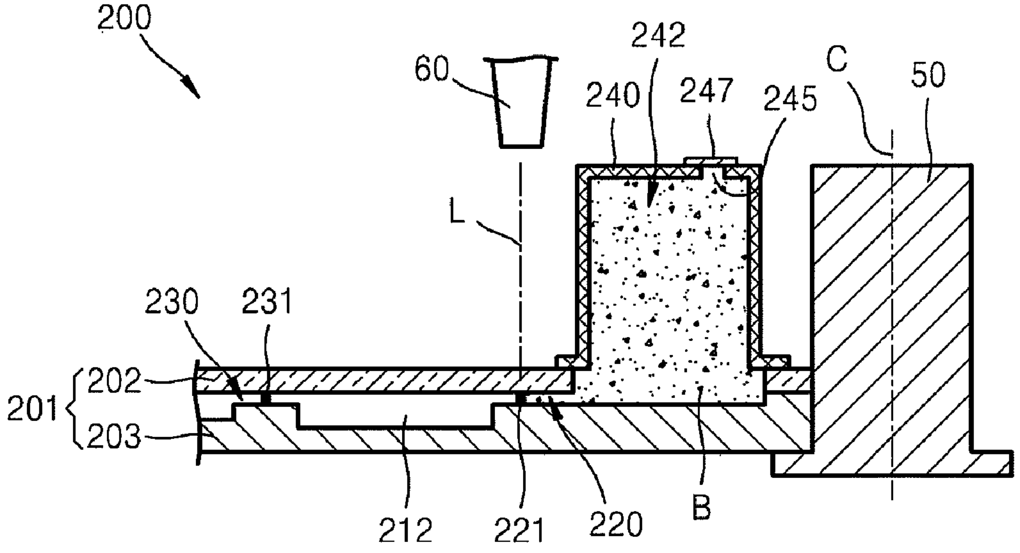
FIGS. 4A and 4B are cross-sectional views sequentially illustrating a fluid-conveying operation in a microfluidic apparatus according to another non-limiting embodiment of the present invention.
Figure 4B:
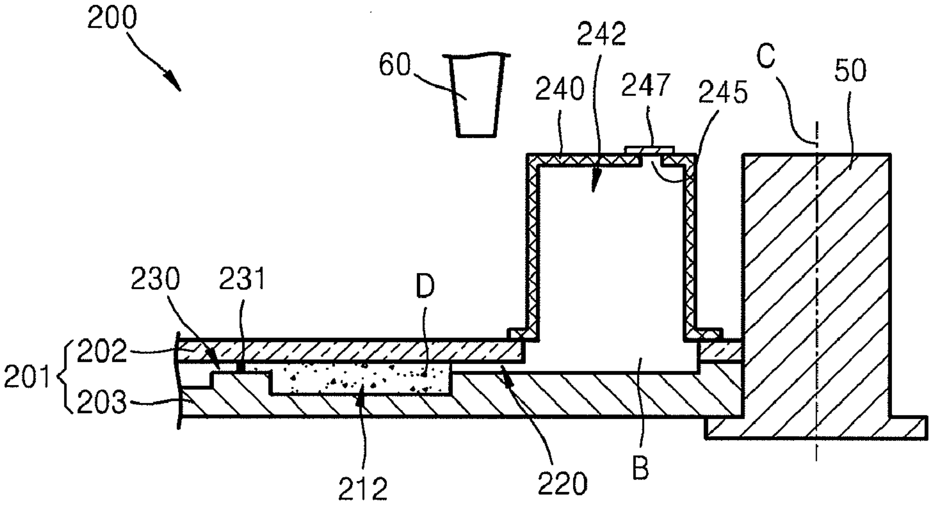

FIGS. 4A and 4B are cross-sectional views sequentially illustrating a fluid-conveying operation in a microfluidic apparatus according to another non-limiting embodiment of the present invention.

Referring to FIGS. 4A and 4B, a microfluidic apparatus 200 according to another non-limiting embodiment of the present invention comprises a disc-shaped substrate 201 and a fluid container 240 which is attached to the substrate 201. A chamber 212 in which a fluid B is accommodated, channels 220 and 230 through which the fluid B is conveyed, and valves 221 and 231 which control the flow of the fluid B along the channels 220 and 230 are provided inside the substrate 201. The chamber 212 is a metering chamber in which only a fixed amount of the fluid B flowed in from the fluid container 240 is accommodated so as to quantitatively supply the fluid B to a mixing chamber (not shown) 116.

The microfluidic apparatus 200 is installed in the spindle motor 50 which provides a rotation driving force. When the microfluidic apparatus 200 is rotated by the operation of the spindle motor 50, a centrifugal force-based pressure is applied to the fluid inside the substrate 201 and the fluid container 240 so that conveying or mixing of the fluid is promoted.

The substrate 201 comprises an upper plate 202 and a lower plate 203 which are adhered to each other. The upper plate 202 and the lower plate 203 may be adhered to each other by ultrasonic wave fusion or by interposing double-sided adhesive tape between the upper and lower plates 202 and 203. The upper plate 202 and the lower plate 203 may be manufactured by injection molding a plastic resin. The fluid container 240 comprises a fluid accommodation space 242 in which the fluid B is accommodated. The fluid container 240 is manufactured by injection molding the plastic resin and is adhered to and fixed in the substrate 201.

A fluid injection hole 245 is formed in the fluid container 240 and the fluid B can be injected into the fluid accommodation space 242 through the fluid injection hole 245.

When the fluid B is accommodated in the fluid accommodation space 242, the fluid injection hole 245 is closed by a closing means such as adhesive tape 247.

The fluid container 240 is disposed to be more near to a rotation center C than the first channel 220.

The fluid container 240 is adhered to the substrate 201 to protrude to a higher position than the upper side of the substrate 201. In the microfluidic apparatus 200 of FIGS. 4A and 4B, the fluid container 240 is separately formed from the upper plate 202 and is attached to the upper plate 202. However, the present invention is not limited to this and the fluid container 240 may also be formed together with the upper plate 202 by plastic resin injection molding.

The valve 221 provided in the channel 220 between the fluid container 240 and the metering chamber 212 constitutes a fluid flow controller which controls the flow of the fluid B toward the channel 220 from the fluid accommodation space 242. The valve 221 prevents arbitrary leakage of the fluid B accommodated in the fluid accommodation space 242 and is exploded and melted by an energy of an electromagnetic wave L, such as a laser, that is incident from an external energy source 60.

The valve 221 is a so-called 'normally closed valve' which closes the channel 220 so that the fluid B cannot be flowed through the valve 221 before the valve 221 absorbs an electromagnetic wave energy. The valve 221 comprises a phase transition material that is melted by the electromagnetic wave energy and a plurality of microheating particles which are dispersed in the phase transition material and absorb the electromagnetic wave energy and dissipate heat. The phase transition material may be a wax. When the wax is heated, it is melted and is changed into a liquid state and its volume expands. For example, the wax may be a paraffin wax, a microcrystalline wax, a synthetic wax or a natural wax etc. The phase transition material may also be a gel or plastic resin. Polyacrylamide, polyacrylates, polymethacrylates or polyvinylamides may be used as the gel. In addition, cyclic olefin copolymer (COC), polymethylmethacrylate (PMMA), polycarbonate (PC), polystyrene (PS), polyoxymethylene (POM), perfluoralkoxy (PEA), polyvinylchloride (PVC), polypropylene (PP), polyethylene terephthalate (PET), polyetheretherketone (PEEK), polyamide (PA), polysulfone (PSU), and polyvinylidene fluoride (PVDF) may be used as the plastic resin.

The microheating particles have a diameter of 1 nm to 100 μm so that they can freely pass through the microchannel 220 having a depth of approximately 0.1 mm and a width of 1 mm. The microheating particles have a characteristic that the temperature of the microheating particles increases rapidly and the microheating particles dissipate heat when the electromagnetic wave energy is supplied to the microheating particles using a method such as irradiating of a laser L. The microheating particles can be dispersed in the wax. To this end, the microheating particles may comprise a core including metal components and a hydrophobic surface structure. For example, the microheating particles may have a molecular structure comprising a core formed of Fe and a plurality of surfactants combined with Fe and surrounding Fe. In general, the microheating particles are kept in a state where they are dispersed in a carrier oil. The carrier oil may be hydrophobic so that the microheating particles having a hydrophobic surface structure can be uniformly dispersed in the carrier oil. The carrier oil in which the microheating particles are dispersed is poured into and mixed with the melted phase transition material so that a material for forming the valve 221 can be formed.

The microheating particles are not limited to polymer particles and may be quantum dot-shaped or magnetic bead-shaped. In addition, the microheating particles may be micro-metal oxides such as $Al_2O_3$, $TiO_2$, $Ta_2O_3$, $Fe_2O_3$, $Fe_3O_4$, and $HfO_2$. The valve 221 may also be formed of only the phase transition material without the microheating particles. The valve 231 that is provided in the other channel 230 is also formed of a phase transition material and a plurality of microheating particles dispersed therein, like the above-described valve 221. Thus, a repeated description of the valve 231 will be omitted. At least a portion of the substrate 201 is transparent so that the electromagnetic wave L projected from the outside of the substrate 201 can be irradiated onto the valves 221 and 231.

When the electromagnetic wave L is irradiated onto the valve 221 formed between the fluid container 240 and the metering chamber 212, using the energy source 60, the micro-heating particles included in the valve 221 dissipate heat rapidly and the phase transition material is rapidly heated. Thus, the valve 221 is rapidly melted, the channel 220 is opened, and the fluid B flows through the channel 220. When the microfluidic apparatus 200, in which the valve 221 is melted, drives and rotates the spindle motor 50, a fluid B (see FIG. 4A) accommodated in the fluid accommodation space 242 passes through the channel 220 and moves to the metering chamber 212 and is accommodated in the metering chamber 212 (see FIG. 4B).

Figure 5:
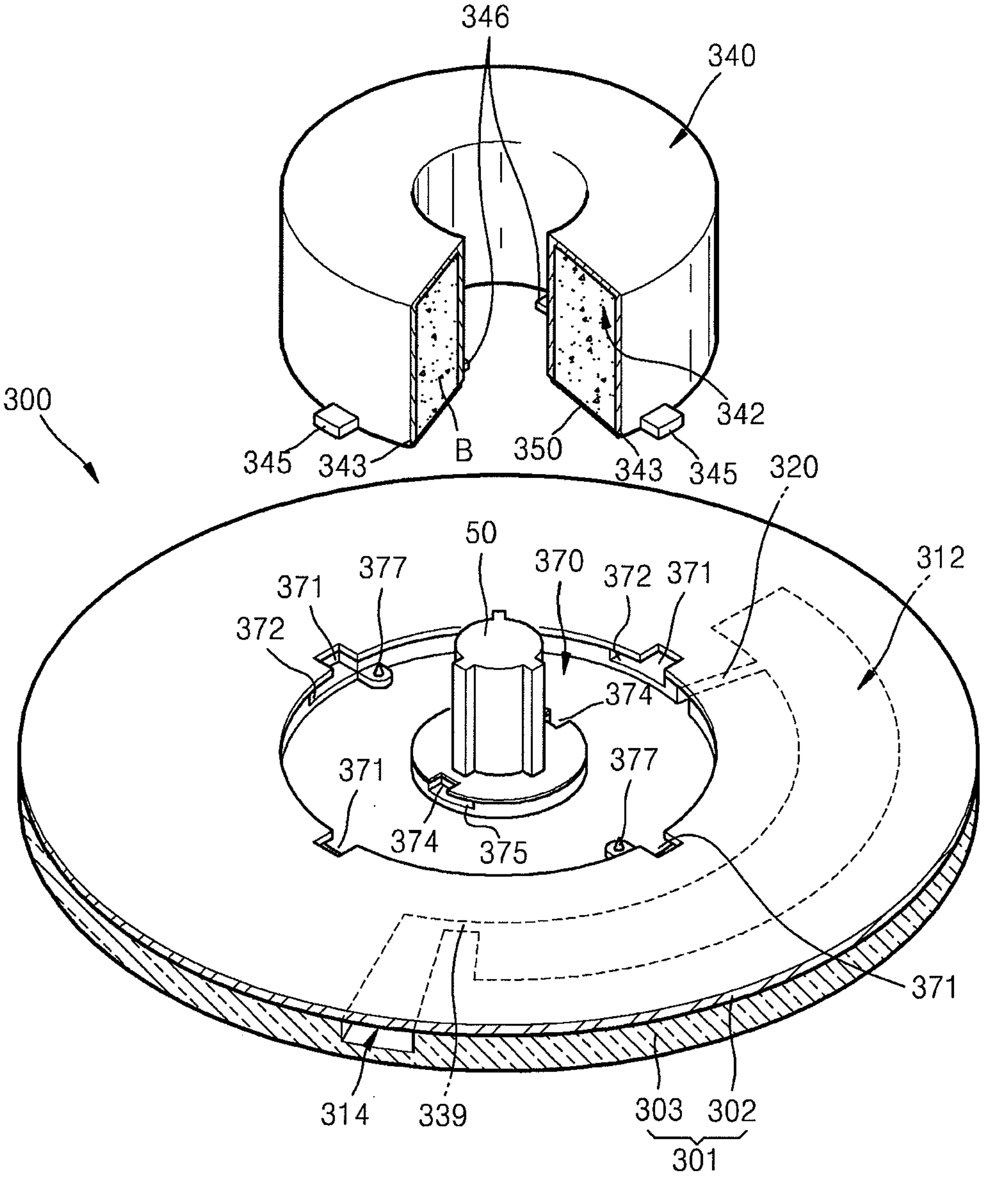
FIG. 5 is an exploded perspective view of a microfluidic apparatus according to another non-limiting embodiment of the present invention.
Figure 6A:
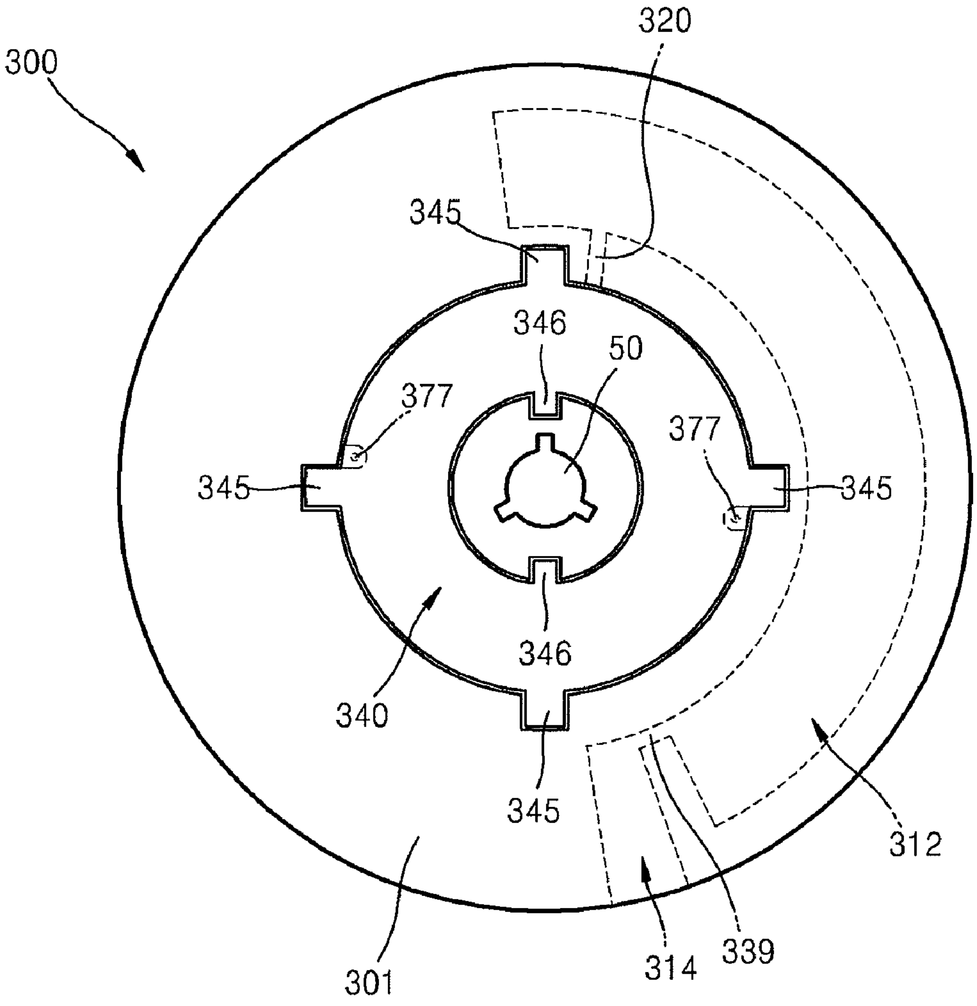
FIGS. 6A and 6B are plan views sequentially illustrating a fluid-conveying operation in the microfluidic apparatus of FIG. 5.
Figure 6B:
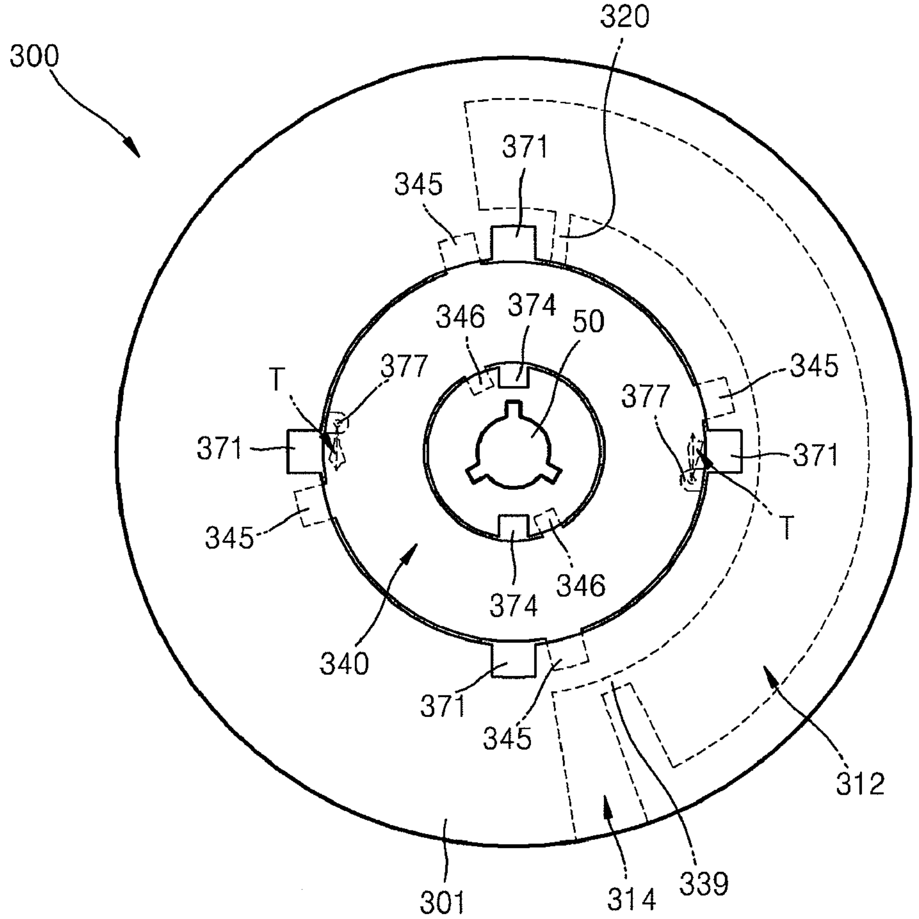

FIG. 5 is an exploded perspective view of a microfluidic apparatus according to another non-limiting embodiment of the present invention, and FIGS. 6A and 6B are plan views sequentially illustrating a fluid-conveying operation in the microfluidic apparatus of FIG. 5.

Referring to FIG. 5, a microfluidic apparatus 300 according to another non-limiting embodiment of the present invention comprises a disc-shaped substrate 301 and a fluid container 340 which is detachably installed in the substrate 301. First and second chambers 312 and 314 in which a fluid B is accommodated and first and second channels 320 and 339 through which the fluid B is conveyed are provided inside the substrate 301.

The microfluidic apparatus 300 is installed in the spindle motor 50 which provides a rotation driving force. When the microfluidic apparatus 300 is rotated by the operation of the spindle motor 50, a centrifugal force-based pressure is applied to the fluid B inside the substrate 301 and the fluid container 340 so that conveying or mixing of the fluid is promoted.

A groove portion 370 is formed at a circumferential portion of the center of the substrate 301 in which the spindle motor 50 is inserted. A lower end portion of the fluid container 340 is detachably formed in the groove portion 370. The groove portion 370 is connected to the first channel 320 and is disposed to be more near the center of the substrate 301 than the first channel 320.

The substrate 301 comprises an upper plate 302 and a lower plate 303 which are adhered to each other. The upper plate 302 and the lower plate 303 may be adhered to each other by ultrasonic wave fusion or by interposing double-sided adhesive tape between the upper and lower plates 302 and 303. The upper plate 302 and the lower plate 303 may be manufactured by injection molding a plastic resin.

The fluid container 340 comprises a fluid accommodation space 342 in which the fluid B is accommodated. The fluid container 340 is manufactured by injection molding a plastic resin. The fluid container 340 in which the fluid B is accommodated is sealed by a container lid 350. Specifically, the fluid container 340 is turned over, the fluid B is injected into the fluid accommodation space 342, and the container lid 350 is adhered to an aperture circumferential portion 343 of the fluid container 340 so that outflow of the fluid can be prevented. The container lid 350 may comprise a thin film formed of metal etc. Four outer connection flanges 345 and two inner connection flanges 346 are disposed at a lower end portion of the fluid container 340. Four outer connection flange accommodation portions 371 in which the outer connection flanges 345 are accommodated and two inner connection flange accommodation portions 374 in which the inner connection flanges 346 are accommodated are disposed at circumferential portions of the groove portion 370.

Clearances 372 and 375 are formed in the outer and inner connection flange accommodation portions 371 and 374 so that the outer and inner connection flanges 345 and 346 can move in the outer and inner connection flange accommodation portions 371 and 374 within a predetermined range. As such, the fluid container 340 can be rotated by a predetermined angle in a state where it is installed in the groove portion 370 of the substrate 301.

When the outer and inner connection flanges 345 and 346 are inserted in the accommodation portions 371 and 374 and the fluid container 340 is slightly rotated counterclockwise, the outer and inner connection flanges 345 and 346 move to the clearances 372 and 375 and are covered in the upper plate 320, the fluid container 340 is attached to the substrate 301 so as not to be arbitrarily separated from the substrate 301. The fluid container 340 is attached to the substrate 301 to protrude to a higher position than the upper side of the substrate 301. The substrate 301 further comprises an explosion unit which explodes the container lid 350. The explosion unit comprises a pin 377 which is formed in the groove portion 370 and protrudes toward the upper side of the substrate 301. However, the explosion unit according to the present invention is not limited to the pin 377 of FIG. 5, and a needle having a sharp edge or a cutter may be used as the explosion unit. In addition, an energy source which irradiates an electromagnetic wave may also be used as the explosion unit.

FIG. 6A illustrates the state where the outer and inner connection flanges 345 and 346 are inserted in the outer and inner connection flange accommodation portions 371 and 374 (see FIG. 5) so as to install the fluid container 340 in the substrate 301. At this time, a small hole may be perforated in the container lid 350 (see FIG. 5) by the pin 377 that protrudes toward the substrate 301. FIG. 6B illustrates the state where the fluid container 340 is slightly rotated counterclockwise from the state of FIG. 6A and is fixed in the substrate 301 not to be separated from the substrate 301. Since the container lid 350 moves about the pin 377 by rotation of the fluid container 340, the small hole formed by the pin 377 is enlarged and the container lid 350 is broken. Reference numeral T of FIG. 6B denotes a portion in which the container lid 350 is broken by the pin 377. The microfluidic apparatus 300 according to another non-limiting embodiment of the present invention comprises the fluid container 340 that can be rotated by a predetermined angle with respect to the substrate 301. However, the present invention is not limited to this and may comprise a fluid container that can be slid on the substrate, for example.

Referring to FIG. 5, when the container lid 350 is broken and the microfluidic apparatus 300 is rotated by the spindle motor 50, the fluid B accommodated in the fluid container 340 passes through the groove portion 370 and the first channel 320 and moves to the first chamber 312 and is accommodated therein. Redundant fluid that is not accommodated in the first chamber 312 passes through the second channel 339 and is accommodated in the second chamber 314.

Figure 7:
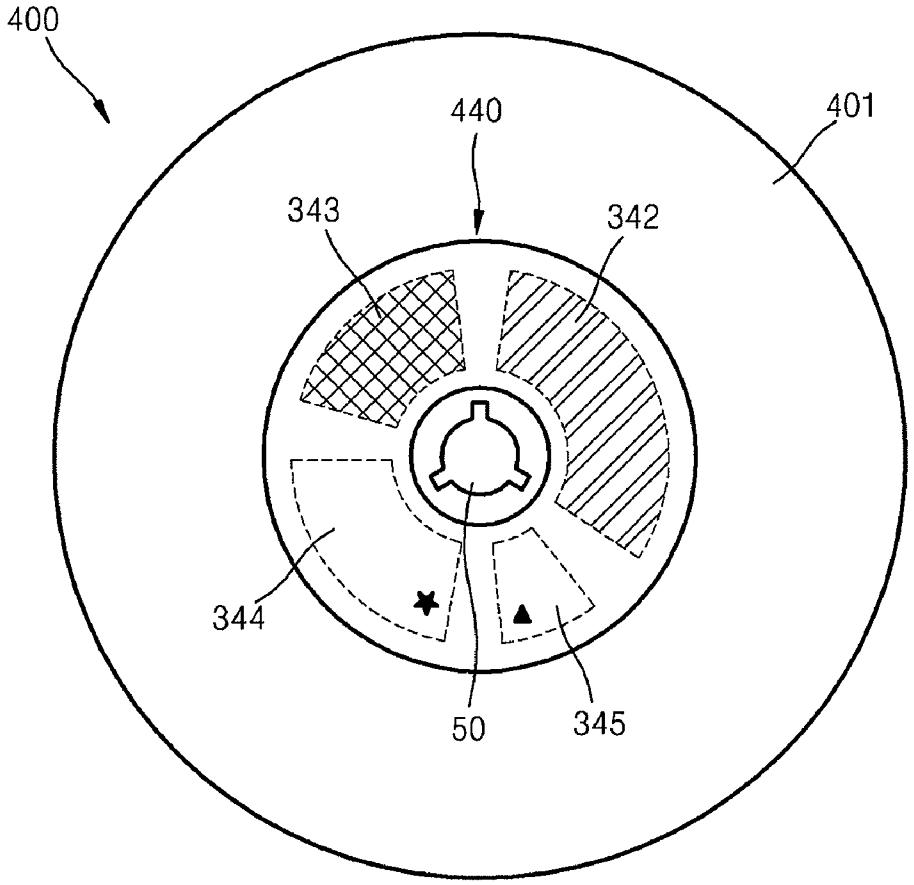
FIG. 7 is a plan view of a microfluidic apparatus according to another non-limiting embodiment of the present invention.

FIG. 7 is a plan view of a microfluidic apparatus according to another non-limiting embodiment of the present invention.

Referring to FIG. 7, a microfluidic apparatus 400 according to another non-limiting embodiment of the present invention comprises a disc-shaped substrate 401 and a fluid container 440 which is attached to the substrate 401. The fluid container 440 comprises a plurality of fluid accommodation spaces 342, 343, 344, and 345.

The plurality of fluid accommodation spaces 342, 343, 344, and 345 are made to be different from one another such that confusion does not occur when a fluid is injected in each fluid accommodation space. Specifically, in this embodiment, the sizes of the first through fourth fluid accommodation spaces 342, 343, 344, and 345 are different from one another.

In FIG. 7, a region inside a dotted line denotes each fluid accommodation space. In addition, the first fluid accommodation space 342 and the second fluid accommodation unit 343 are different from each other because different colors are coated on outer sides of the first and second fluid accommodation spaces 342. In FIG. 7, hatching of the first and second fluid accommodation spaces 342 and 343 denote different colors. In addition, different patterns are formed on the outside of the third fluid accommodation space 344 and the fourth fluid accommodation space 345 so that the third and fourth fluid accommodation spaces 344 and 345 are different from each other.

For example, a star-shaped pattern is formed in the third fluid accommodation space 344, and a triangular pattern is formed in the fourth fluid accommodation space 345. Although not shown in FIG. 7, like embodiments shown in other drawings, the microfluidic apparatus 400 according to another non-limiting embodiment of the present invention comprises a channel through which a fluid is conveyed and a fluid flow controller which controls the flow of the fluid accommodated in the fluid accommodating spaces 342, 343, 344, and 344, which are provided inside the substrate 401.

The microfluidic apparatus according to the present invention may comprise a fluid container which is not limited by the thickness of a substrate and in which a large amount of fluid is accommodated. Thus, the substrate does not need to be increased so as to increase the capacity of the fluid container and the arrangement of the chamber and the channel in the substrate can be easily performed. As a result, costs for manufacturing the microfluidic apparatus can be reduced and an integrated microfluidic apparatus can be easily performed.

While the present invention has been particularly shown and described with reference to exemplary, non-limiting embodiments thereof, it will be understood by those of ordinary skill in the art that various changes in form and details may be made therein without departing from the spirit and scope of the present invention as defined by the following claims.

What is claimed is:

1. microfluidic apparatus comprising:

a substrate including at least one channel;

a fluid container in which at least one kind of fluid is accommodated and which is disposed on the substrate so as to allow the fluid to flow toward the channel;

a fluid flow controller which controls a flow of the fluid toward the channel from the fluid container;

wherein the fluid container is attached to the substrate to be rotated or slid on the substrate, and the fluid flow container comprises a container lid which prevents arbitrary outflow of the fluid accommodated in the fluid container;

wherein the substrate comprises an explosion unit which explodes the container lid by contacting the container lid when the fluid container is rotated or slid on the substrate;

wherein the fluid flow controller comprises a valve formed of a phase transition material that closes the channel, wherein the fluid flow controller is melted by an energy of an electromagnetic wave to open the channel;

wherein the valve further comprises a plurality of microheating particles which are dispersed in the phase transition material and that absorb an energy of an electromagnetic wave to dissipate heat; and wherein the fluid container is attached to an upper surface of the substrate such that the fluid container is provided on top of the substrate.

2. The microfluidic apparatus of claim 1, wherein the fluid container is adhered to and fixed on the substrate.

3. The microfluidic apparatus of claim 1, wherein the fluid container is detachably attached to the substrate.

4. The microfluidic apparatus of claim 1, wherein the microfluidic apparatus is installed in a motor providing a rotational driving force and is rotatable.

5. The microfluidic apparatus of claim 4, wherein the fluid container is disposed closer to a rotation center of the microfluidic apparatus than the channel.

6. The microfluidic apparatus of claim 1, wherein the fluid container further comprises a pouch in which the fluid is accommodated and which is sealed to be perforated.

7. The microfluidic apparatus of claim 1, wherein the fluid flow controller prevents arbitrary outflow of the fluid accommodated in the fluid container and comprises a container lid which is perforated or melted by an energy of an electromagnetic wave.

8. The microfluidic apparatus of claim 7, wherein at least a portion of the fluid container is transparent so that the electromagnetic wave can be incident on the container lid.

9. The microfluidic apparatus of claim 7, wherein the container lid comprises a thin film on which an electromagnetic wave-absorbing material is coated.

10. The microfluidic apparatus of claim 9, wherein the thin film is formed of metal.

11. The microfluidic apparatus of claim 1, wherein a height of the fluid container is greater than a thickness of the substrate.

12. The microfluidic apparatus of claim 1, wherein the fluid container comprises a plurality of fluid accommodation spaces in which at least two kinds of fluid are separated and accommodated, and the plurality of fluid accommodation spaces are each differentiated by having, respectively, different sizes, different colors or different patterns formed on the outside thereof.

13. The microfluidic apparatus of claim 1, wherein the phase transition material is one of a wax, a gel or a plastic resin.

14. The microfluidic apparatus of claim 1, wherein the plurality of microheating particles are micrometal oxides.

15. The microfluidic apparatus of claim 14, wherein the micrometal oxides are one of $Al_2O_3$, $TiO_2$, $Ta_2O_3$, $Fe_2O_3$, $Fe_3O_4$ or $HfO_2$.

16. The microfluidic apparatus of claim 1, wherein the microheating particles are one of polymer particles, quantum dots or magnetic beads.

17. The microfluidic apparatus of claim 1, wherein a height of a fluid accommodation space of the fluid container is greater than a thickness of the substrate.

18. A microfluidic apparatus comprising:

a substrate including at least one channel;

a fluid container in which at least one kind of fluid is accommodated and which is disposed on the substrate so as to allow the fluid to flow toward the channel; and a fluid flow controller which controls a flow of the fluid toward the channel from the fluid container;

wherein the fluid flow controller comprises a valve formed of a phase transition material that closes the channel, wherein the fluid flow controller is melted by an energy of an electromagnetic wave to open the channel;

wherein the fluid container is attached to the substrate to be rotated or slid on the substrate, and the fluid flow controller comprises a container lid which prevents arbitrary outflow of the fluid accommodated in the fluid container; and wherein the substrate comprises an explosion unit which explodes the container lid by contacting the container lid when the fluid container is rotated or slid on the substrate.

19. The microfluidic apparatus of claim 18, wherein the container lid comprises a thin film, and the explosion unit comprises a pin which protrudes toward the container lid.

20. The microfluidic apparatus of claim 18, wherein the fluid container has flanges that are accommodated in flange connection portions of the substrate, such that when the fluid container is rotated or slid on the substrate, the flanges are locked in the flange connection portions.

21. The microfluidic apparatus of claim 18, wherein the fluid container is attached to an upper surface of the substrate such that the fluid container protrudes above a top of the substrate.

* * * * *